L. ROUANET.
BORE VERIFYING APPARATUS.
APPLICATION FILED FEB. 16, 1918.

1,382,859.

Patented June 28, 1921.

INVENTOR:
Louis Rouanet
BY Wm Wallace White,
ATTY.

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE.

BORE-VERIFYING APPARATUS.

1,382,859.   Specification of Letters Patent.   Patented June 28, 1921.

Application filed February 16, 1918. Serial No. 217,684.

*To all whom it may concern:*

Be it known that I, LOUIS ROUANET, citizen of the Republic of France, residing at 42 Rue Franklin, Ivry-Port, Seine, in the Republic of France, have invented new and useful Improvements in Bore-Verifying Apparatus, of which the following is a specification.

The present invention belongs to the class of devices employed for verification of bores, in which a cone is engaged at a greater or less depth within the bore itself, or preferably between a set of tactile bodies which are themselves in close contact with the wall of said bore at several equidistant points of the same.

In order that a device of this kind shall have a really practical character, it must present the following characteristics.

The tactile bodies must rest in contact with a perfectly machined and smooth surface which is disposed in an exactly perpendicular plane to that of a piece which serves as a guide to the verifying cone. To this effect the cone is formed of a hollow sleeve which slides without play upon a cylindrical piece in order to carry out the testing, and this sliding movement is always regular and automatically braked, at least to a certain degree, by friction with a spring piece disposed inside the cylindrical piece.

The apparatus should allow of a very close adjustment for the required degree of precision at all times, on account of the wear which is likely to occur upon the cone arising from an extensive use of the apparatus or the wear which is caused between the different parts of the same, said adjustment being effected by means of an adjustable contact member provided upon the cylindrical piece employed to guide the movement of the cone.

The above conditions are realized in the apparatus constructed in accordance with the present invention and the inspecting operation is considerably simplified by the use of an independent checking or testing block adapted to act as a limit gage. Said checking block is used in combination with the above mentioned contact member which is so adjusted that its upper surface is precisely on the same level as the upper surface of the sleeve or cone and the diameter of the bore to be inspected is verified by simply presenting the checking block upon the contact member and the upper end of the sleeve or cone as will be more fully described hereafter.

The invention applies still more specially, and using the above-mentioned parts, to the verification of the diameter of the rolling way on outer rings of ball bearings, and to this end the tactile bodies (balls) between which is inserted the testing cone, are of the same diameter as the balls which are to be subsequently used between the outer ring in question and an inner ring. The tactile bodies are here disposed in holders which are pivoted upon the base and are constantly pressed toward the outside by flat springs which bear upon small pins also fixed to the base. The outward movement of these tactile bodies is limited by small projections carried by the holders, which bear against a cylindrical groove in the base of the apparatus.

The apparatus comes within the class of new industrial products, and concerns the use of testing apparatus designed according to the above indications and more specially the testing apparatus of the kind in question, in which the operator engaged in checking up the pieces is subject to make frequent errors, especially where the reading is taken by means of a graduated scale and a vernier. Such work of checking various pieces is always more exact by the use of the standard block on account of the real sensation of touch which enters into play from the tilting thus produced, *i. e.* in the above example on one of the surfaces of the standard block.

The action of the apparatus will be better understood by referring to the accompanying drawing which is given merely as an example for the better comprehension of the present method.

Figure 1:
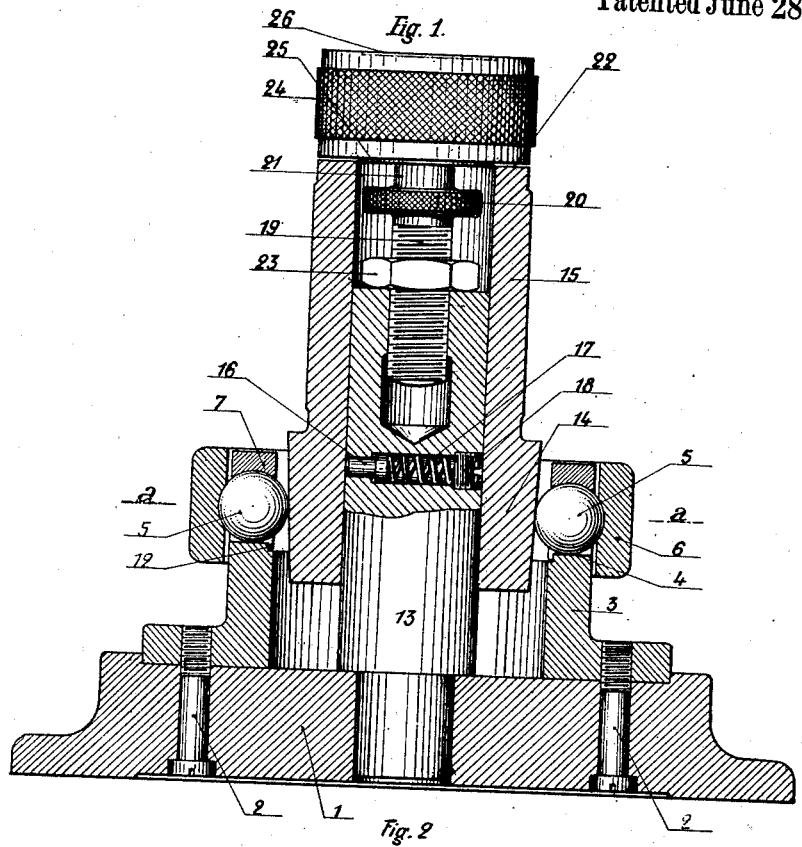
Figure 1, is a vertical section of a verifying apparatus constructed in accordance with the present invention.
Figure 2:
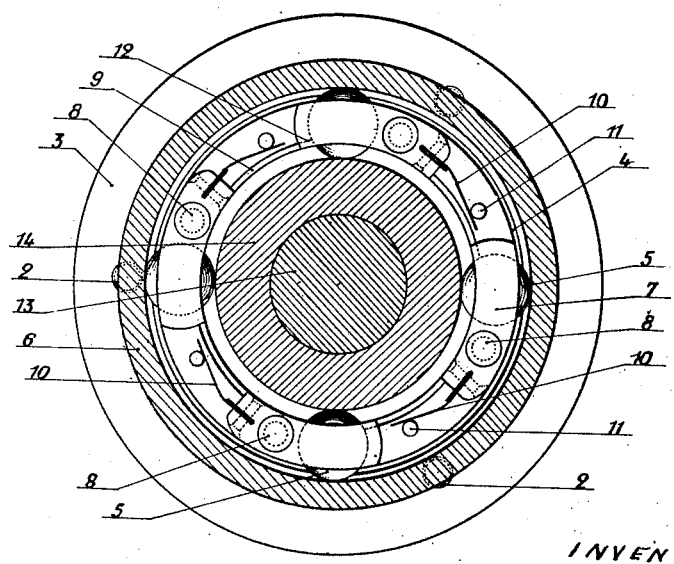
Fig. 2, is a horizontal cross section taken approximately along the line *a—a*, in Fig. 1.

The present device consists of a base 1, having properly centered and fixed thereon by means of the screws 2, a sleeve or flanged cylindrical piece 3. This sleeve possesses a perfectly machined surface 4 upon which rest the tactile bodies 5, and these according to the present invention are represented by balls of the same diameter as are to be used in a ball bearing made up of the outer ball bearing ring 6 (see Fig. 1) and an inside ring.

The balls 5 are fitted into the pieces 7 mounted on pivots 8 upon the sleeve 3. A spring 10 is disposed on each of the pieces 7 and presses upon a small stud 11 on the sleeve 3, so as to keep the balls constantly pressed outwardly. This movement is limited by means of small stop pieces 12 mounted on the pieces 7 and coming against the surface of a cylindrical groove 9 in the sleeve 3.

Upon the base 1 is mounted, at right angles to the plane of the surface 4 of the sleeve 3, a cylindrical piece or rod 13 which is concentric with the sleeve 3.

The conical testing piece 14 is integral with the sleeve 15 and its descending movement upon the rod 13 is suitably braked by means of a small stud 16 which is pressed against the inside of the sleeve 15 by a spring 17 disposed within the cylindrical rod 13 and held at the other end by a small screw plug 18.

At the top of the rod 13 is mounted an adjustable contact member which is composed of an ordinary screw 19 carrying a milled head 20 which ends in a suitably rectified cylindrical part 21. This latter can be easily brought (by screwing or unscrewing) to the same level as the top surface 22 of the sleeve 15, and after adjustment, a lock-nut 23 allows of clamping the screw 19 in place.

After adjusting the apparatus as above indicated by the use of a standard piece, the cone 14 is raised sufficiently to allow of removing this latter. A piece which is to be verified by the apparatus is then slipped over the tactile bodies 5 and it becomes automatically centered about the latter. The cone 14 is then brought against the tactile bodies 5, and if the test piece has the same diameter as the standard piece, the surface of the piece 21 and the surface 22 will now be situated in the same plane. For this operation and in order to effect the verification there is employed a standard or checking block 24 and it contains a milled portion for facility in handling.

The present device is especially designed for verifying the inside diameter of the rolling way of outer rings for ball bearings. If, for instance, it is proposed to allow in said diameter a variation of +0 and −.05 millimeter, the testing cone being designed with a slope of 10 per cent., the checking block should have a plane face 26 having a central countersunk part and carry on its other face 25 a central projecting portion having a height of .5 millimeter and, of course, a diameter smaller than the bore of the sleeve 15. If the surface 26 of the checking block is placed upon the end surface 22 of the sleeve 15 and the top of the contact member 21, this block, when manipulated, should allow of no play or tilting movement. On the contrary, if the opposite face 25 of the block is laid upon the members 15 and 21, the block should tilt when manipulated.

In this way, an operator engaged all day in the work of verifying such pieces will become able to carry out this work readily and without requiring to use the sense of sight. In certain cases it can be ascertained by feeling alone, that the standard block does not tilt when laid on either side, and this shows that the piece under test has too small a diameter and is under the prescribed limit. On the contrary should the piece tilt on both sides, this shows that the piece under test has too large a diameter. But when surface 26 does not tilt and surface 25 does so, this indicates that the piece is within the prescribed limits.

It should also be observed that the screw 19 allows of effecting the proper adjustment of the apparatus in all cases, either where the cone 14 has become worn down, or in the case of a certain amount of play existing between the various component parts.

Having now described my invention, what I claim as new and desire to secure by Letters Patent is:

1. An apparatus for the verification of bores containing, in combination, a conical piece movable within the bore to be verified, a guide piece for said conical piece, a base supporting said guide piece, a normally fixed contact member and a checking block adapted to be placed on said conical piece and said contact member, said checking block being adapted to act as a limit gage.

2. An apparatus for the verification of bores, containing in combination, a conical sleeve movable within the bore to be verified, a guiding shaft disposed within said conical sleeve, a base supporting said guiding shaft, an adjustable contact screw with flat head disposed at the end of the guiding shaft, and a checking block which can be laid in position on said conical shaft and on the head of the contact screw, said checking block being adapted to act as a limit gage.

3. A contact for the verification of bores containing, in combination, tactile bodies, adapted to contact with the wall of the bore to be verified, means for holding said tactile bodies, a conical sleeve centrally movable among said tactile bodies, a guiding shaft disposed within said conical sleeve, a base supporting said shaft, means for braking the movement of said conical sleeve with reference to said guiding shaft, an adjustable contact screw with flat head disposed at the end of the guiding shaft, means for clamping said screw and a checking block which can be laid in position on said conical shaft and on the head of the contact screw, said checking block being adapted to act as a limit gage.

4. An apparatus for the verification of bores, containing, in combination, a base, a cylindrical sleeve mounted upon said base, tactile bodies disposed upon said cylindrical sleeve and adapted to contact with the wall of the bore, means for applying said tactile bodies against the piece to be verified, a guiding shaft mounted on the base and within said cylindrical shaft, a conical sleeve fitting upon said shaft, a braking stud provided in said shaft, an adjustable contact screw with flat head disposed at the end of the guiding shaft, a lock nut for clamping said screw and a checking block which can be laid in position on said conical sleeve and on the head of the contact screw, said checking block being adapted to act as a limit gage.

In testimony whereof I have signed my name to this specification in the presence of two subscribing witnesses.

LOUIS ROUANET.

Witnesses:
 LOUIS MOSES,
 CHAS. P. PRESSLY.